(12) United States Patent
Taguchi et al.

(10) Patent No.: US 8,810,961 B2
(45) Date of Patent: Aug. 19, 2014

(54) RECORDING HEAD WITH DUAL COIL/DUAL SHIELD ARRANGEMENT AND HIGH FREQUENCY OSCILLATOR

(75) Inventors: Tomoko Taguchi, Kunitachi (JP); Yusuke Tomoda, Zama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 6 days.

(21) Appl. No.: 13/548,922

(22) Filed: Jul. 13, 2012

(65) Prior Publication Data

US 2013/0016441 A1 Jan. 17, 2013

(30) Foreign Application Priority Data

Jul. 14, 2011 (JP) ................................ 2011-156007

(51) Int. Cl.
*G11B 5/17* (2006.01)
*G11B 5/11* (2006.01)
*G11B 5/235* (2006.01)
*G11B 5/31* (2006.01)

(52) U.S. Cl.
USPC .................................. 360/123.11; 360/125.3

(58) Field of Classification Search
CPC ............................ G11B 5/1278; G11B 5/3123
USPC ......................................... 360/123.11, 125.3
See application file for complete search history.

(56) References Cited

U.S. PATENT DOCUMENTS

| 8,107,352 B1 * | 1/2012 | Yamanaka et al. | ....... 360/125.02 |
| 2008/0180827 A1 * | 7/2008 | Zhu et al. | ......................... 360/59 |
| 2008/0212239 A1 * | 9/2008 | Kawato et al. | ................. 360/319 |
| 2009/0310244 A1 * | 12/2009 | Shimazawa et al. | ............. 360/75 |
| 2010/0007992 A1 * | 1/2010 | Yamada et al. | ................ 360/244 |
| 2010/0134922 A1 * | 6/2010 | Yamada et al. | ........... 360/123.01 |

FOREIGN PATENT DOCUMENTS

| JP | 2008-004251 | 1/2008 |
| JP | 2008-171503 | 7/2008 |
| JP | 2008-305486 | 12/2008 |
| JP | 2009-048719 | 3/2009 |
| JP | 2010-003351 | 1/2010 |
| JP | 2010-020857 | 1/2010 |
| JP | 2010-040060 | 2/2010 |
| JP | 2010-157303 | 7/2010 |

OTHER PUBLICATIONS

Japanese Office Action, issued in corresponding Japanese patent application No. 2011-156007 mailed Jan. 29, 2013, 2 pages (with English translation).

* cited by examiner

*Primary Examiner* — Craig A. Renner
(74) *Attorney, Agent, or Firm* — Patterson & Sheridan, LLP (57) ABSTRACT

According to one embodiment, a recording head includes a main pole, a trailing shield including a first connecting portion and a second connecting portion, and configured to form together with the main pole a first magnetic core, a leading shield including a first connecting portion connected to the main pole through a magnetic material and an end portion opposing to the end portion of the main pole through a non-magnetic material, and configured to form together with the main pole a second magnetic core, and first and second coils wound around the first and second magnetic cores, and a connection terminal configured to flow a current through the main pole, non-magnetic conductive layer, and trailing shield.

20 Claims, 10 Drawing Sheets

RECORDING HEAD WITH DUAL COIL/DUAL SHIELD ARRANGEMENT AND HIGH FREQUENCY OSCILLATOR

CROSS-REFERENCE TO RELATED APPLICATIONS

This application is based upon and claims the benefit of priority from prior Japanese Patent Application No. 2011-156007, filed Jul. 14, 2011, the entire contents of which are incorporated herein by reference.

FIELD

Embodiments described herein relate generally to a recording head for perpendicular magnetic recording used in a disk drive and to a disk drive provided with this recording head.

BACKGROUND

A disk drive, such as a magnetic disk drive, comprises a magnetic disk, spindle motor, magnetic head, and carriage assembly. The magnetic disk is disposed in a case. The spindle motor supports and rotates the magnetic disk. The magnetic head reads data from and writes data to the magnetic disk. The carriage assembly supports the magnetic head for movement relative to the magnetic disk. The carriage assembly includes a rotatable arm, and a suspension extending from the arm. The magnetic head is supported on the extended end of the suspension. The magnetic head includes a slider attached to the suspension, and a head section on the slider. The head section comprises a recording head for writing and a read head for reading.

Magnetic heads for perpendicular magnetic recording have recently been proposed in order to increase the recording density and capacity of a magnetic disk drive or reduce its size. In one such magnetic head, a recording head comprises a main pole configured to produce a perpendicular magnetic field, trailing shield, and coil. The trailing shield is located on the trailing side of the main pole with a write gap therebetween and configured to close a magnetic path that leads to the magnetic disk. The coil serves to pass magnetic flux through the main pole.

A magnetic head based on high-frequency field assist recording is proposed in which a high-frequency oscillator is disposed between a main pole and an end portion of a trailing shield on the recoding medium side, and an electric current is applied to the high-frequency oscillator through the main pole and trailing shield.

When an electric current is flowed from the main pole to the trailing shield, disturbance of a magnetic domain in the main pole can be eliminated, an efficient magnetic path can be led, and a magnetic field generated from an end of the main pole is intensified. However, in such a head configuration, a large return magnetic field is also generated immediately below the trailing shield arranged at the trailing end of the main pole to interpose a small gap therebetween, thereby resulting in a problem that erasing or deterioration of a recorded signal occurs.

DETAILED DESCRIPTION

Various embodiments will be described hereinafter with reference to the accompanying drawings. In general, according to one embodiment, a recording head includes: a main pole configured to apply a recording magnetic field in a direction perpendicular to a recording layer of a recording medium; a trailing shield on a trailing side of the main pole with a write gap therebetween, comprising a first connecting portion connected to the main pole through a non-conductor and a second connecting portion connected to an end portion of the main pole on the recording medium side through a non-magnetic conductive layer, and configured to form together with the main pole a first magnetic core; a first coil wound around the first magnetic core; a leading shield on a leading side of the main pole with a gap therebetween, comprising a first connecting portion connected to the main pole through a magnetic material and an end portion opposing to an end portion of the main pole on the recording medium side through a non-magnetic material, and configured to form together with the main pole a second magnetic core; a second coil configured to be wound around the second magnetic core; and a connection terminal configured to flow a current through the main pole, the non-magnetic conductive layer, and the trailing shield.

First Embodiment

Figure 1:
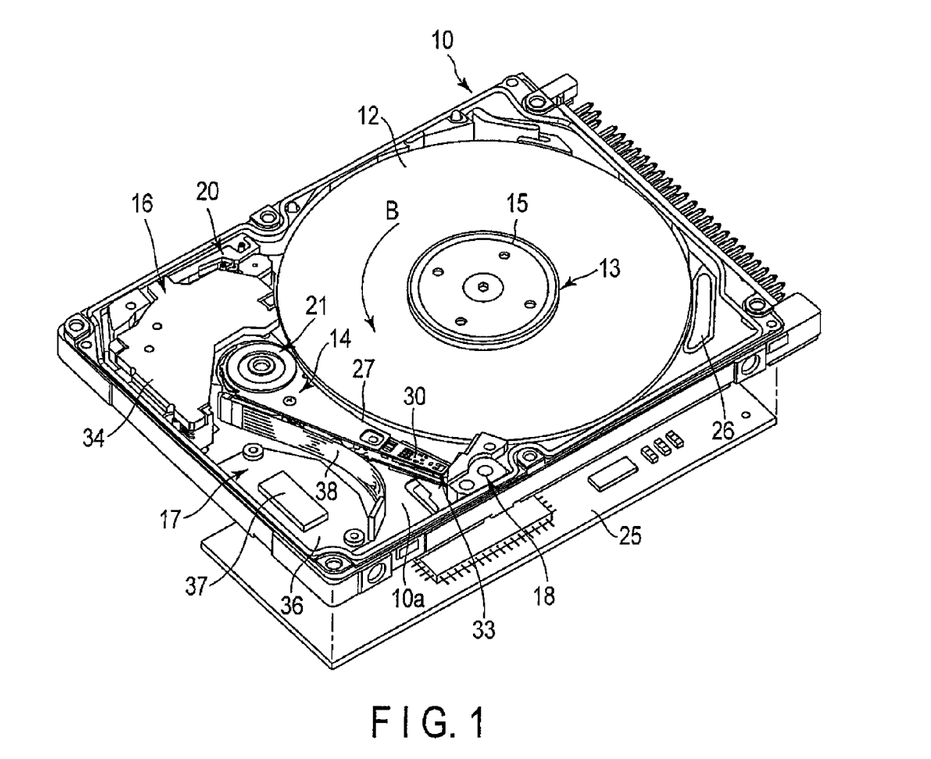
FIG. 1 is a perspective view showing a hard disk drive (referred to as an HDD hereinafter) according to a first embodiment.
Figure 2:
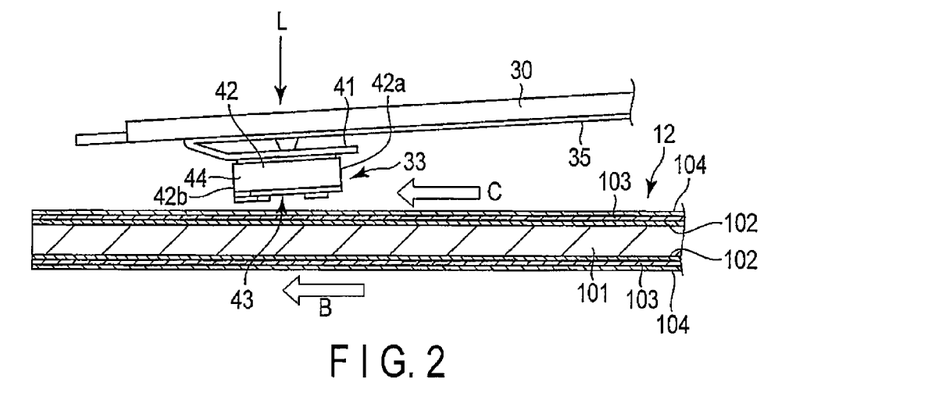
FIG. 2 is a side view showing a magnetic head and a suspension in the HDD.

FIG. 1 shows the internal structure of a hard disk drive (HDD) as a disk drive according to a first embodiment with its top cover removed, and FIG. 2 shows a flying magnetic head. As shown in FIG. 1, the HDD comprises a housing 10. The housing 10 comprises a base 10a in the form of an open-topped rectangular box and a top cover (not shown) in the form of a rectangular plate. The top cover is attached to the base by screws such that it closes the top opening of the base. Thus, the housing 10 is kept airtight inside and can be ventilated through a breather filter 26.

The base 10a carries thereon a magnetic disk 12, for use as a recording medium, and a drive section. The drive section comprises a spindle motor 13, a plurality (e.g., two) of magnetic heads 33, head actuator 14, and voice coil motor (VCM) 16. The spindle motor 13 supports and rotates the magnetic disk 12. The magnetic heads 33 record and reproduce data on and from the disk 12. The head actuator 14 supports the heads 33 for movement relative to the surfaces of the disk 12. The VCM 16 pivots and positions the head actuator. The base 10a further carries a ramp loading mechanism 18, inertial latch 20, and board unit 17. The ramp loading mechanism 18 holds the magnetic heads 33 in a position off the magnetic disk 12 when the magnetic heads are moved to the outermost periphery of the magnetic disk. The inertial latch 20 holds the head actuator 14 in a retracted position if the HDD is jolted, for example. Electronic components, such as a preamplifier, head IC, etc., are mounted on the board unit 17.

A control circuit board 25 is attached to the outer surface of the base 10a by screws such that it faces a bottom wall of the base. The circuit board 25 controls the operations of the spindle motor 13, VCM 16, and magnetic heads 33 through the board unit 17.

As shown in FIG. 1, the magnetic disk 12 is coaxially fitted on a hub of the spindle motor 13, clamped by a clamp spring 15 screwed at an upper end of the hub, and thereby fixed to the hub. The magnetic disk 12 is driven to rotate in a direction of an arrow B at a predetermined speed by the spindle motor 13 as a drive motor.

The head actuator 14 comprises a bearing portion 21 fixed on a bottom wall of the base 10a and arms 27 extended from the bearing portion 21. These arms 27 are placed at predetermined intervals therebetween in parallel with a surface of the magnetic disk 12, and they are extended in the same direction from the bearing portion 21. The head actuator 14 includes an elastically deformable elongated plate-like suspension 30. A suspension 30 is constituted of a leaf spring, and its proximal end is fixed to an end of each arm 27 by spot welding or bonding and extended from each arm. Each suspension 30 may be integrally formed with the corresponding arm 27. A magnetic head 33 is supported at an extended end of each suspension 30. The arm 27 and the suspension 30 constitute a head suspension, and this head suspension and the magnetic head 33 constitute a head suspension assembly.

As shown in FIG. 2, each magnetic head 33 comprises a slider 42 formed into a substantially rectangular parallelepiped shape and a recording/reproduction head portion 44 provided at an outflow end (a trailing end) of this slider. The magnetic head 33 is fixed to a gimbal spring 41 provided at an end portion of the suspension 30. A load L heading for the surface of the magnetic disk 12 is applied to each magnetic head 33 by elasticity of the suspension 30. Two arms 27 are placed in parallel at a predetermined interval therebetween, and the suspension 30 and the magnetic head 33 disposed to each of these arms face the counterparts to sandwich the magnetic disk 12 therebetween.

Each magnetic head 33 is electrically connected to a later-described main FPC 38 through a relay flexible printed circuit board (referred to as a relay FPC hereinafter) fixed on the suspension 30 and the arm 27.

As shown in FIG. 1, the board unit 17 has an FPC main body 36 formed of a flexible printed circuit board and a main FPC 38 extending from the FPC main body. The FPC main body 36 is fixed on the bottom surface of the base 10a. Electronic components including a preamplifier 37, a head IC, and others are mounted on the FPC main body 36. An extended end of the main FPC 38 is connected to the head actuator 14, and it is connected to the magnetic head 33 through each relay FPC 35.

The VCM 16 has a non-illustrated support frame extended from the bearing portion 21 in an opposite direction of the arm 27 and a voice coil supported by the support frame. In a state that the head actuator 14 is incorporated in the base 10a, the voice coil is placed between a pair of yokes 34 fixed on the base 10a, and the voice coil, these yokes, and magnets fixed to the yokes constitute a VCM 16.

In a state that the magnetic disk 12 is rotated, when the voice coil of the VCM 16 is energized, the head actuator 14 rotationally moves, and the magnetic head 33 is moved onto and positioned on a desired track of the magnetic disk 12. At this time, the magnetic head 33 is moved between an inner peripheral portion and an outer peripheral portion of the magnetic disk along a radial direction of the magnetic disk 12.

Figure 3:
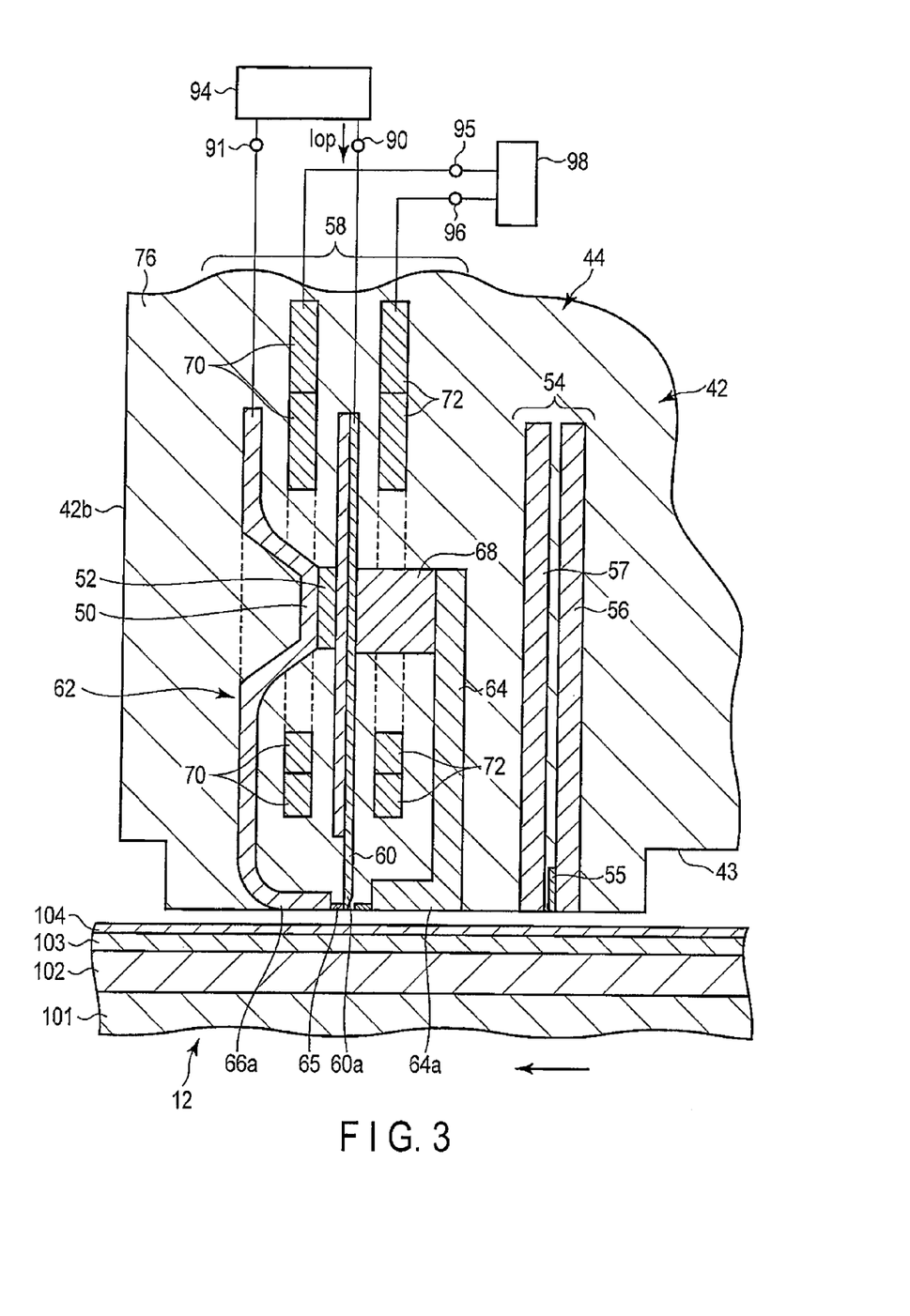
FIG. 3 is a cross-sectional view showing a head section of the magnetic head in an enlarging manner.

Configurations of the magnetic disk 12 and the magnetic head 33 will now be described in detail. FIG. 3 is an enlarged cross-sectional view showing the head portion 44 of the magnetic head 33 and the magnetic disk.

As shown in FIG. 1 to FIG. 3, the magnetic disk 12 has, e.g., a board 101 which is formed into a discoid shape having a diameter of 2.5 inches and made of a non-magnetic material. On each surface of the board 101 are sequentially laminated a soft magnetic layer 102 made of a material exercising soft magnetic characteristics as an underlying layer, a magnetic recording layer 103 having magnetic anisotropy in a direction perpendicular to a disk surface, and a protective coat layer 104.

As shown in FIG. 2 and FIG. 3, the magnetic head 33 is constituted as a float type head and has a slider 42 formed into a substantially rectangular parallelepiped shape and a head portion formed at an end portion of the slider on an outflow end (trailing) side. The slider 42 is formed of, e.g., a sintered compact (ALTiC) of alumina and a titanium carbide, and the head portion 44 is formed by laminating a thin film.

The slider 42 has a rectangular disk facing surface (an air bearing surface (ABS)) facing the surface of the magnetic disk 12. The slider 42 floats by an air current C generated between the disk surface and the disk facing surface 43 due to rotation of the magnetic disk 12. A direction of the air current C coincides with a rotational direction B of the magnetic disk 12. The slider 42 is arranged with respect to the surface of the magnetic disk 12 in such a manner that a longitudinal direction of the disk facing surface 43 substantially coincides with the direction of the air current C.

The slider 42 has a leading end 42a placed on an inflow side of the air current C and a trailing end 42b placed on an outflow side of the air current C. A leading step, a trailing step, a side step, a negative pressure cavity, and others which are not shown in the drawings are formed on the disk facing surface 43 of the slider 42.

As shown in FIG. 3, the head portion 44 has a reproducing head 54 and a recording head 58 formed at the trailing end 42b of the slider 42 in a thin-film process, and it is formed as a separation type magnetic head.

The reproducing head 54 is constituted of a magnetic film 55 which exercises a magneto-resistance effect and shield films 56 and 57 which are arranged on a trailing side and a leading side of this magnetic film to sandwich the magnetic film 55. The magnetic film 55 and lower ends of the shield films 56 and 57 are exposed on the disk facing surface 43 of the slider 42.

Figure 4:
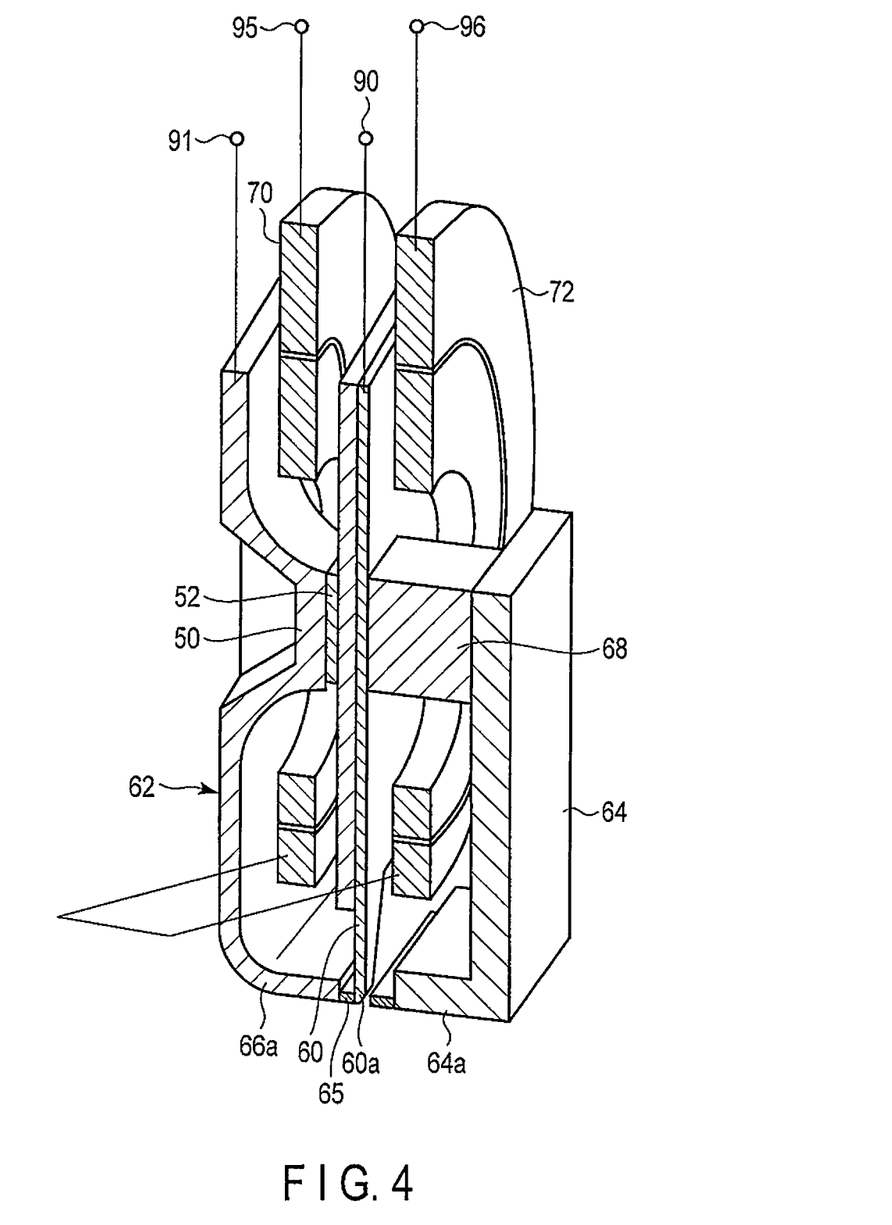
FIG. 4 is a perspective view schematically showing a recording head of the magnetic head.

The recording head 58 is provided on the trailing end 42b side of the slider 42 with respect to the reproducing head 54. FIG. 4 is a perspective view schematically showing the recording head 58 and the magnetic disk 12, and FIG. 5 is an enlarged cross-sectional view showing an end portion of the recording head 58 on the magnetic disk side.

Figure 5:
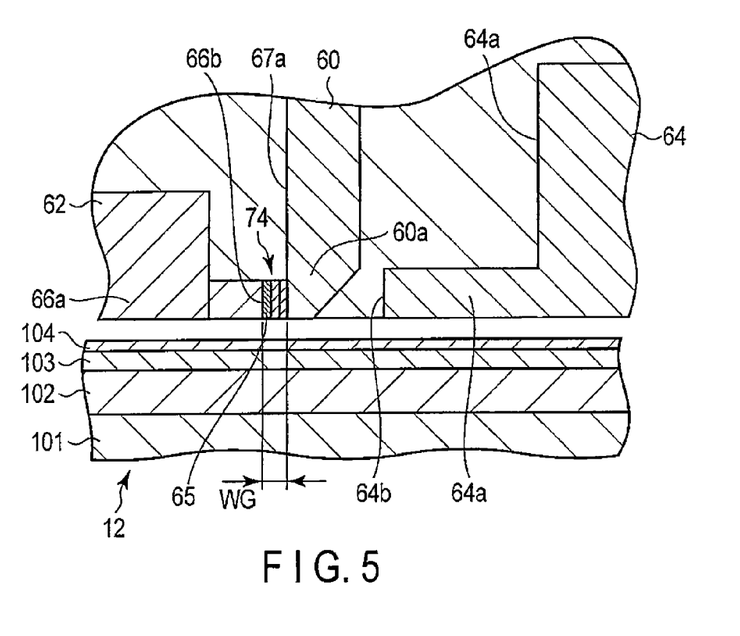
FIG. 5 is a cross-sectional view showing a disk side end portion of the recording head in an enlarging manner.

As shown in FIG. 3 to FIG. 5, the recording head 58 has a main pole 60 made of a high magnetic permeability material which generates a recording magnetic field in a direction perpendicular to the surface of the magnetic disk 12, a trailing shield 62, and a leading shield 64, and it constitutes a first magnetic core which forms a magnetic path comprising the main pole 60 and the trailing shield 62 and a second magnetic core which forms a magnetic path comprising the main pole 60 and the leading shield 64. The recording head 58 has a first coil 70 wound around the first magnetic core and a second coil 72 wound around the second magnetic core.

The main pole 60 substantially vertically extends with respect to the surface of the magnetic disk 12. An end portion 60a of the main pole 60 on the magnetic disk 12 side is narrowed to taper toward the disk surface. The end portion 60a of the main pole 60 has trailing side end surface with a predetermined width which has a trapezoidal cross section and is placed on the trailing end side, a leading side end surface which faces the trailing end surface and has a width narrower than the trailing side end surface, and both side surfaces. An end surface of the pole 60 is exposed on the disk facing surface 43 of the slider 42. A width of the trailing side end surface substantially corresponds to a width of the track of the magnetic disk 12.

The trailing shield 62 made of a soft magnetic material is arranged on the trailing side of the main pole 60 and provided to efficiently close the magnetic path through the soft magnetic layer 102 immediately below the main pole. The trailing shield 62 is formed into a substantially L-like shape and has a first connecting portion 50 and a second connecting portion connected to the main pole 60. The first connecting portion 50 is connected to an upper portion of the main pole 60, i.e., an upper portion apart from the disk facing surface 43 through a non-conductor 52.

The trailing shield 62 is formed into a substantially L-like shape, and its end portion 66a is formed into an elongated rectangular shape. An end surface of the trailing shield 62 is exposed on the disk facing surface 43 of the slider 42. A leading side end surface 66b of the end portion 66a extends along the width direction of each track of the magnetic disk 12. This leading side end surface 66b faces a trailing side end surface 67a of the main pole 60 in parallel to interpose a write gap WG therebetween.

In the vicinity of the disk facing surface 43, a non-magnetic conductive layer 65 which electrically joins the end portion 60a of the main pole 60 and the leading side end surface 66b of the trailing shield 62 is arranged between these members. The end portion 66a of the trailing shield 62 constitutes the second connecting portion. The non-magnetic conductive layer 65 may be either a single layer or a multilayer structure in which non-magnetic conductive layers are laminated. As a material of the non-magnetic conductive layer 65, Cu, Ag, Au, Al, or nichrome can be used.

A high-frequency oscillator may be provided between the non-magnetic conductive layer 65 and the main pole 60. In this embodiment, a high-frequency oscillator, e.g., a spin-torque oscillator 74 is provided between the non-magnetic conductive layer 65 and the distal end 60a of the main pole 60. This spin-torque oscillator 74 is constituted by sequentially laminating an underlying layer, a spin injection layer (a second magnetic material layer), an intermediate layer, an oscillation layer (a first magnetic material layer), and a cap layer from the main pole 60 side to the trailing shield 62 side.

Terminals 90 and 91 are connected to the main pole 60 and the trailing shield 62, and a power supply 94 is connected to these terminals 90 and 91. A current circuit is constituted so that a current lop can be conducted in series from this power supply 94 through the main pole 60, the spin-torque oscillator 74, the non-magnetic conductive layer 65, and the trailing shield 62.

As shown in FIG. 3 and FIG. 4, the recording head 58 has a first coil (a recording coil) 70 arranged to wind around a magnetic path including the main pole 60 and the trailing shield 62 in order to flow a magnetic flux through the main pole 60 when writing a signal in the magnetic disk 12. The first coil 70 is wound around the first connecting portion 50 between the main pole 60 and a return pole 62.

As shown in FIG. 3 to FIG. 5, the leading shield 64 made of the soft magnetic material is provided to face the main pole on the leading side of the main pole 60. The leading shield 64 is formed into a substantially L-like shape, and its end portion 64a on the magnetic disk 12 side is formed into an elongated rectangular shape. An end surface (a lower end surface) of this end portion 64a is exposed on the disk facing surface 43 of the slider 42. A trailing side end surface 64b of the end portion 64a is extended along the width direction of each track of the magnetic disk 12. This trailing side end surface 64b faces the leading side end surface of the main pole 60 in parallel to interpose a gap therebetween. A protective coat insulating film as a later-described non-magnetic material is placed in this gap.

The leading shield 64 has a first connecting portion 68 joined to the main pole 60 at a position apart from the magnetic disk 12. This first connecting portion 68 is made of, e.g., a soft magnetic material, and the first connecting portion 68, the main pole 60, and the leading shield 64 form a magnetic circuit. The recording head 58 is arranged to wind around a magnetic path including the main pole 60 and the leading shield 64 and has a second coil 72 that applies a magnetic field to this magnetic circuit. The second coil 72 is wound around the first connecting portion 68 between, e.g., the main pole 60 and the leading shield 64. It is to be noted that a non-conductor or a non-magnetic material may be inserted into a part of the first connecting portion 68.

The second coil 72 is wound in a direction opposite to that of the first coil 70. Terminals 95 and 96 are connected to the first coil 70 and the second coil 72, respectively, and a second power supply 98 is connected to these terminals 95 and 96. The second coil 72 is connected to the first coil 70 in series. It is to be noted that current supply to the first coil 70 and the second coil 72 may be separately controlled. Currents supplied to the first coil 70 and the second coil 72 are controlled by a control module of the HDD.

In the above-described recording head 58, a soft magnetic material that is used to form the main pole 60, the trailing shield 62, and the leading shield 64 can be selected from alloys or chemical compounds including at least one of Fe, Co, and Ni.

As shown in FIG. 3, the reproducing head 54 and the recording head 58 are covered with a protective insulating film 76 except portions exposed on the disk facing surface of the slider 42. The protective insulating film 76 constitutes an outer shape of the head portion 44.

According to the thus configured HDD, when the VCM 16 is driven, the head actuator 14 is rotationally moved, and the magnetic head 33 is moved onto and positioned on a desired track of the magnetic disk 12. Further, the magnetic head 33 floats by an air current C generated between the disk surface and the disk facing surface 43 by the rotation of the magnetic disk 12. At the time of operations of the HDD, the disk facing surface 43 of the slider 42 faces the disk surface while keeping a gap therebetween. As shown in FIG. 2, the magnetic head 33 floats in an inclined posture that enables the closet approach of recording head 58 of the head portion 44 to the surface of the magnetic disk 12. In this state, the reproducing head 54 is used to read recorded information from the magnetic disk 12, and the recording head 58 is used to write information into the magnetic disk 12.

In writing of information, as shown in FIG. 3, a direct current is flowed from the power supply 94 to the main pole 60, the spin-torque oscillator 74, the non-magnetic conductive layer 65, and the trailing shield 62 to generate a high-frequency magnetic field from the spin-torque oscillator 74, and this high-frequency magnetic field is applied to the magnetic recording layer 103 of the magnetic disk 12. Further, the first coil 70 excites the main pole 60 by flowing an alternating current from the power supply 98 to the first coil 70 and the second coil 72, and a perpendicular recording magnetic field is applied from this main pole to the recording layer 103 of the magnetic disk 12 provided immediately below. As a result, information is recorded in the magnetic recording layer 103 with a desired track width. When the high-frequency magnetic field is superimposed on the recording magnetic field, magnetic recording with high retaining force and high magnetic anisotropic energy can be performed. Furthermore, when the current is flowed from the main pole 60 to the trailing shield 62, disturbance of a magnetic domain in the main pole 60 can be eliminated, an efficient magnetic path can be led, and the magnetic field generated from the end of the main pole can be intensified.

At this time, when the current is flowed through the second coil 72 to excite the leading shield 64 and a desired magnetic field is flowed through the closed magnetic path including the main pole 60 and the leading shield, the return magnetic field can be prevented from being concentrated to a position immediately below the trailing shield 62. That is, the return magnetic field can be also dispersed in the leading shield 64 by the magnetic field flowing through the closed magnetic path including the leading shield 64, thereby suppressing the intensive return to the direction of the trailing shield 62.

As a result, deterioration or erasing of recorded information in the recording tracks can be suppressed. Therefore, the deterioration or erasing of recorded information can be prevented while assuring the recording capability on the write tracks, and high track density of the recording layer of the magnetic disk 12 can be realized, thereby improving recording density of the HDD.

Figure 6:
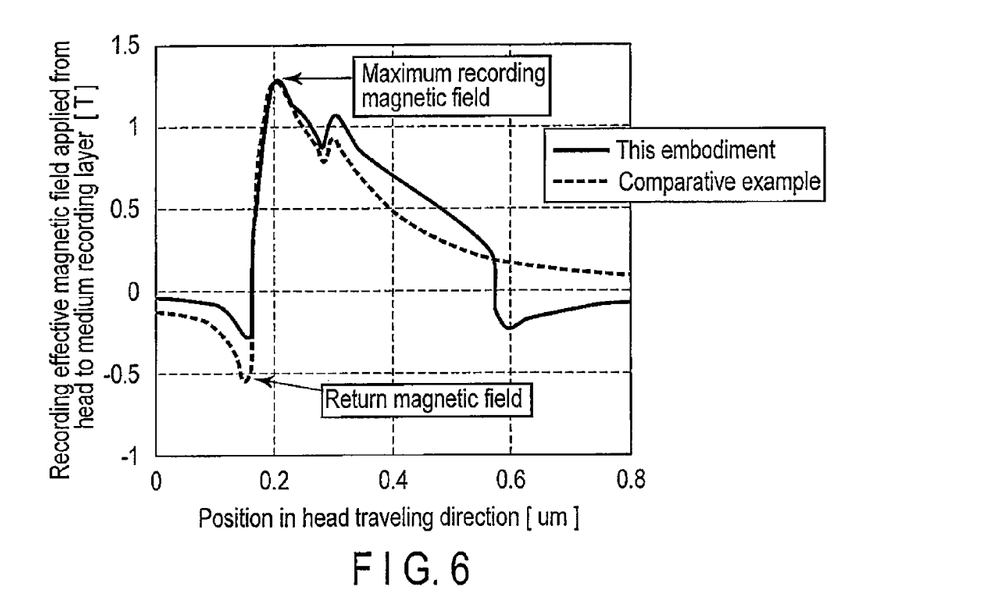
FIG. 6 is a view showing a relationship between a recording effective magnetic field and a position in a head traveling direction of the recording head according to the first embodiment and that of a recording head according to a comparative example in comparison.

FIG. 6 shows a recording magnetic field distribution in a track traveling direction which is applied from the recording head 58 of the HDD to the magnetic disk 12 according to the first embodiment and a recording magnetic field distribution in a track traveling direction which is applied from a recording head to a magnetic disk according to a comparative example in comparison. Here, the recording head according to the comparative example is provided with a main pole, a trailing shield, and a first coil without having a leading shield and a second coil.

To perform recording in the magnetic recording layer on the magnetic disk with good SN, the maximum effective magnetic field must be intensified and, at the same time, suppressing an absolute value of the return magnetic field is also important to avoid erasing or deterioration of recorded information after carrying out recording. In regard to the recording head 58 according to the first embodiment, it can be understood that the maximum effective magnetic field substantially remains the same but magnitude of the return magnetic field is suppressed as compared with the comparative example.

Figure 7:
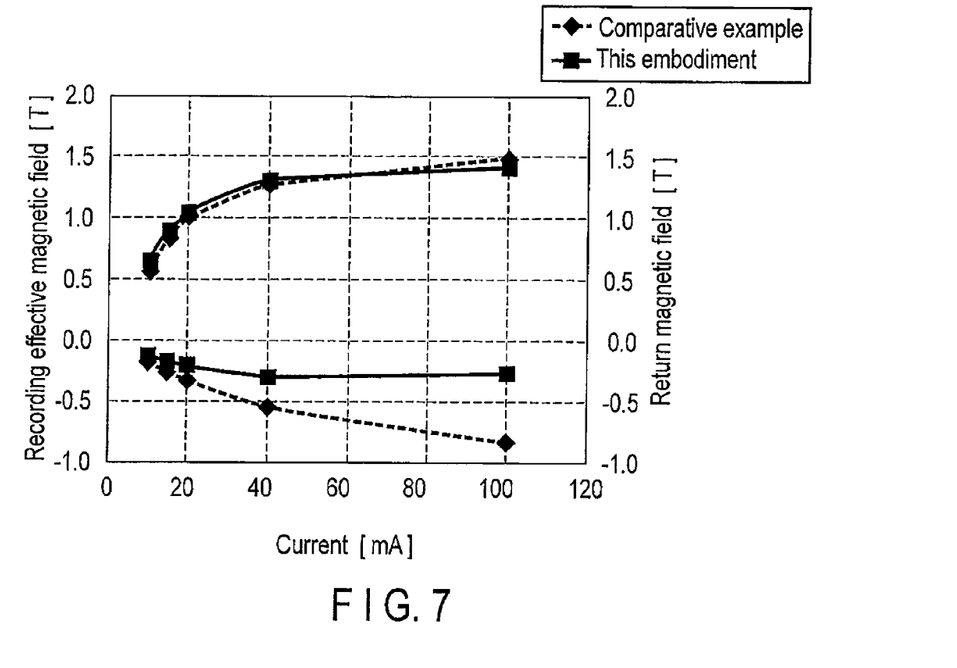
FIG. 7 is a view showing a relationship between a recording effective magnetic field, an applied current, and a return magnetic field of the recording head according to the first embodiment and that of the recording head according to the comparative example in comparison.

FIG. 7 shows maximum effective magnetic fields and maximum values of the return magnetic fields of the recording head 58 according to the first embodiment and the recording head according to the comparative example when the current Iop energizing the main pole and the trailing shield is changed in comparison. In this embodiment, it can be understood that the maximum effective magnetic field is the same as the conventional example at any current value but the return magnetic field is suppressed.

Figure 8:
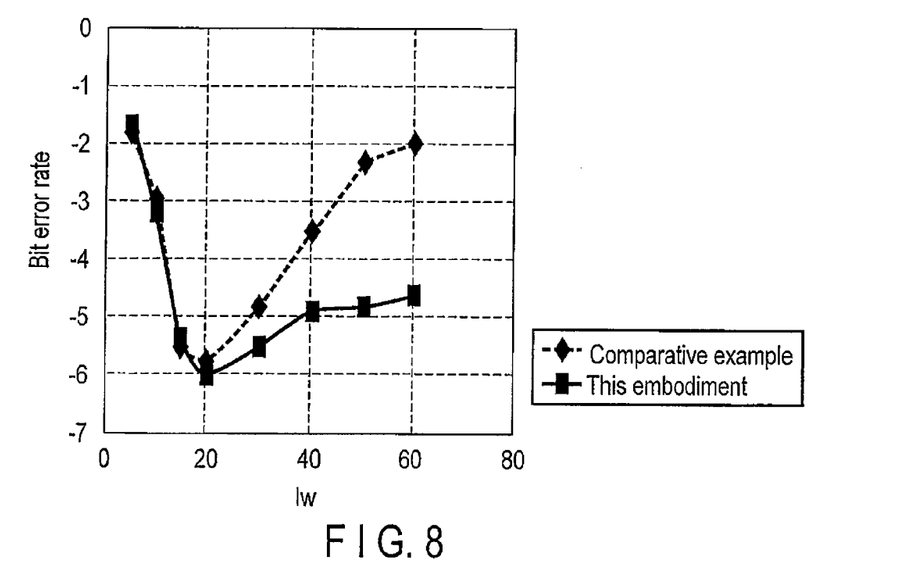
FIG. 8 is a view showing a relationship between a bit error rate and the applied current of the recording head according to the first embodiment and that of the recording head according to the comparative example in comparison.

FIG. 8 shows saturation characteristics of the recording head 58 according to this embodiment and the recording head according to the comparative example in comparison. It can be understood that a bit error rate is deteriorated on a high-current side in the comparative example whereas deterioration of a bit error rate on the high-current side is suppressed in this embodiment.

Therefore, according to the recording head of HDD in this embodiment, when the leading core is arranged and the second coil is wound around a magnetic core on the leading side in the pole energization type recording head which generates a high recording magnetic field, the return magnetic field concentrated in the trailing shield can be suppressed, deterioration of a recorded signal can be restrained, and recording density of the magnetic disk drive can be improved.

An HDD according to another embodiment will now be described. It is to be noted that, in another example described below, like reference numerals denote parts equal to those in the first embodiment to omit detailed explanation thereof, and parts different from the first embodiment will be mainly described in detail.

Second Embodiment

Figure 9:
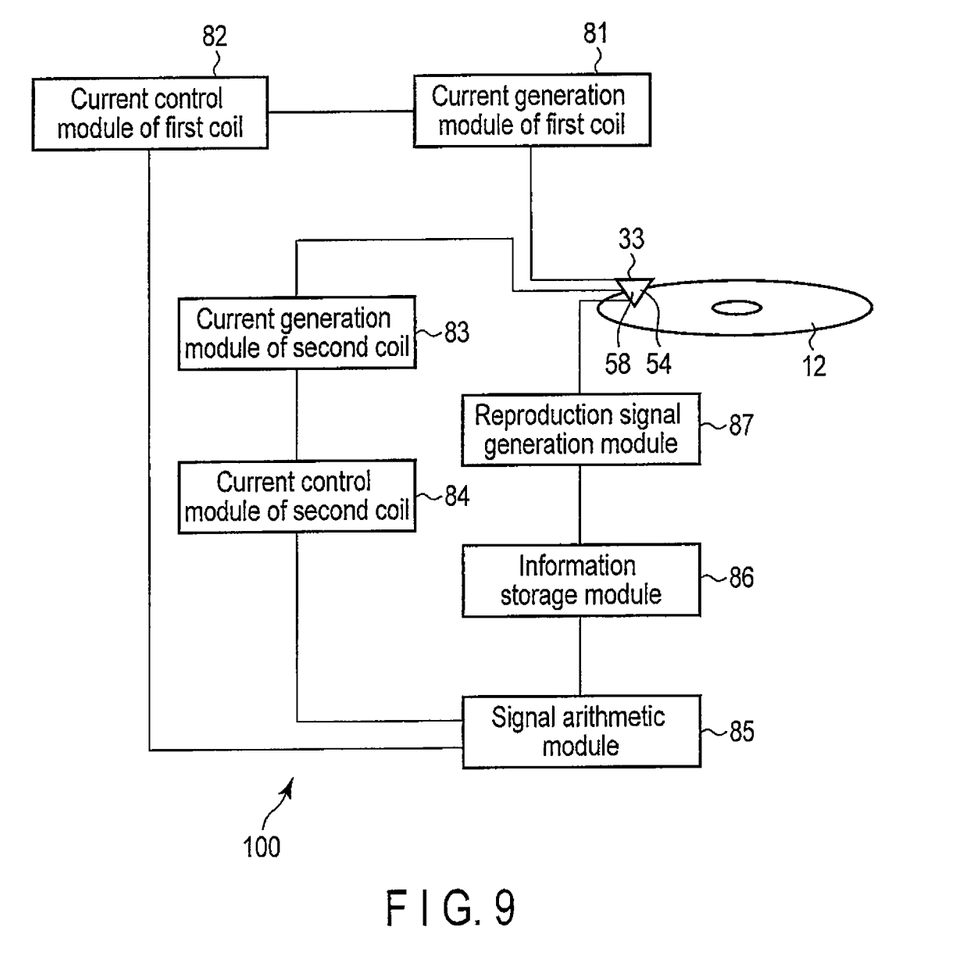
FIG. 9 is a block diagram schematically showing a head control module of an HDD according to a second embodiment.

FIG. 9 schematically shows a configuration of a control module 100 which controls operations of a magnetic head 33 in an HDD according to a second embodiment. The control module 100 is provided on, e.g., the above-described control circuit board 25. It is to be noted that the control module 100 may be provided in a preamplifier unit of a board unit 17 provided in a housing 10 of the HDD.

The magnetic head 33 of the HDD comprises a reproducing head 54 and a recording head 58, and it is constituted like the first embodiment as shown in FIG. 3. A current generation module 81 and a current control module 82 are connected to a first coil 70 in the recording head 58, and a current generation module 83 and a current control module 84 are connected to a second coil 72. A reproduction signal detection module 87, an information storage module 86, and a signal arithmetic module 85 are connected to the reproducing head 54 in the magnetic head 33. The signal arithmetic module 85 is connected to the current control module 82 of the first coil and the current control module 84 of the second coil.

The control module 100 uses the reproduction signal detection module 87 to detect a signal read from the magnetic disk 12 by the reproducing head 54 and stores the detected signal in the information storage module 86. Further, the detected signal is subjected to an arithmetic operation by the signal arithmetic module 85, and a threshold value of the signal subjected to the arithmetic operation is compared with a bit error rate (BER). Moreover, the control module 100 uses the first and second current control modules 82 and 84 to adjust currents that energize the first coil 70 and the second coil 72 in accordance with a comparison result and also uses the current control module 82 to control a recording current which is supplied to the first coil 70 in accordance with a write signal.

Figure 10:
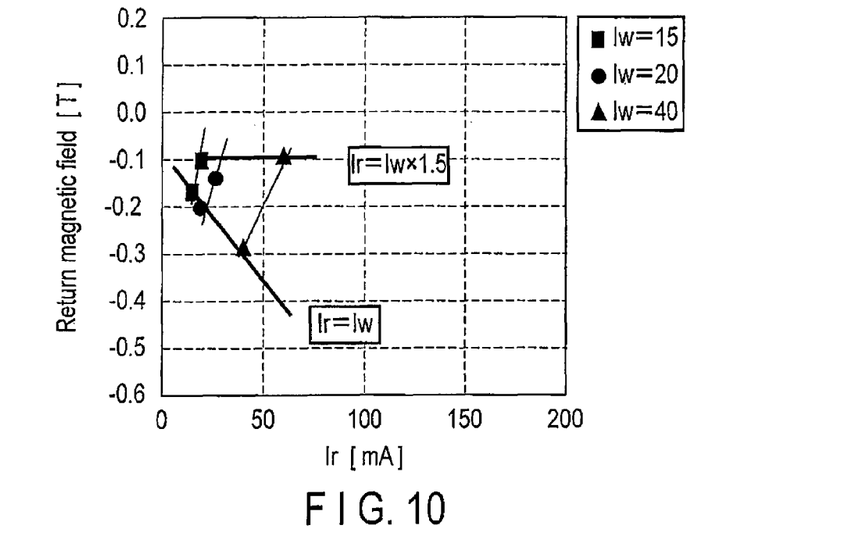
FIG. 10 is a view showing a relationship between applied currents Ir and Iw and a return magnetic field of a recording head in the HDD according to the second embodiment.

In FIG. 10, magnitude of a return magnetic field is plotted with respect to three conditions of Iw in a case that a total current value Ir flowing through the second coil 72 is the same as the total current value. Iw flowing through the first coil 70 and a case that the total current value Ir is 1.5-fold of the total current value Iw. It is desirable to reduce this return magnetic field to be smaller than a magnetization reversal start magnetic field Hn corresponding to material characteristics of a magnetic recording layer of a magnetic disk. In this embodiment, a magnetic recording layer having Hn=0.18 (T) was used. It can be understood that, since Ir was set to be 1.5-fold of Iw, the return magnetic field is greatly suppressed and the return magnetic field falls below Hn of the magnetic disk in the range of Iw=15 to 40 (mA).

Figure 11:
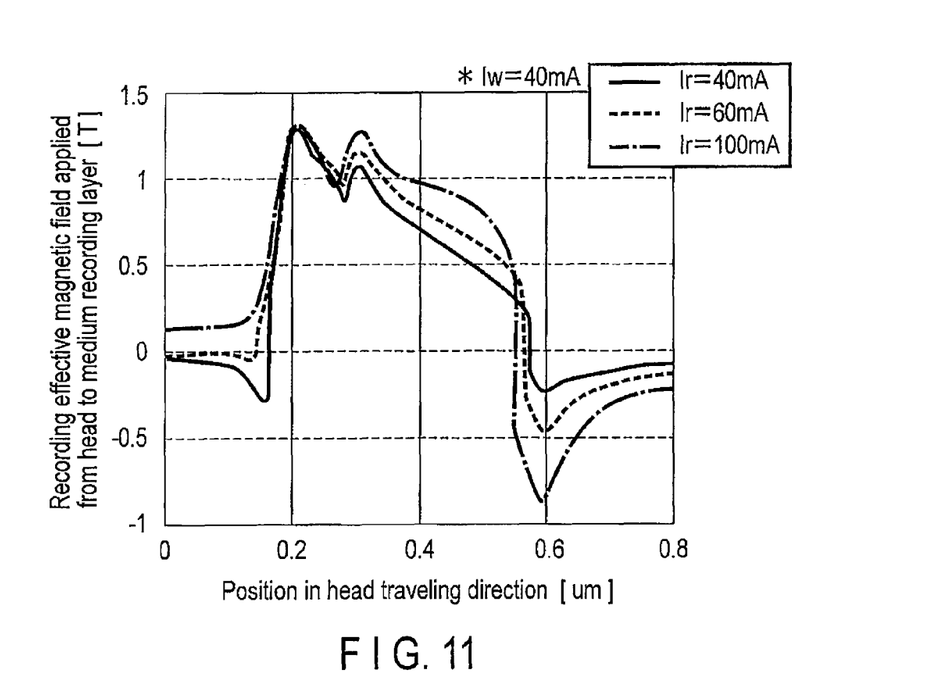
FIG. 11 is a view showing a relationship between a recording effective magnetic field and a position in a head traveling direction of the recording head in the HDD according to the second embodiment in accordance with each applied current in comparison.

FIG. 11 shows changes in magnetic field distribution in the HDD according to the second embodiment when the total current value Ir flowing through the first coil is 40 mA and the total current value Iw flowing through the second coil is changed. It can be understood from this drawing that an absolute value of a negative component in the return magnetic field of the trailing shield is reduced when Ir=Iw×1.5 (Iw=60 mA). Additionally, when Ir is increased to Ir=Iw×2.5 (Ir=100 mA), an end portion of the trailing shield has a positive magnetic field, a magnetic field gradient is thereby reduced, and transition noise is increased, whereby BPI cannot be earned. Therefore, it is desirable to prevent Ir from being extremely increased. An increase in negative magnetic field of the leading shield has no problem irrespective of states of medium magnetization of the magnetic recording layer since the negative magnetic field is a magnetic field before recording, and a good recording state can be obtained at the end portion of the trailing shield by preceding erase effect if the increase is considerable.

Figure 12:
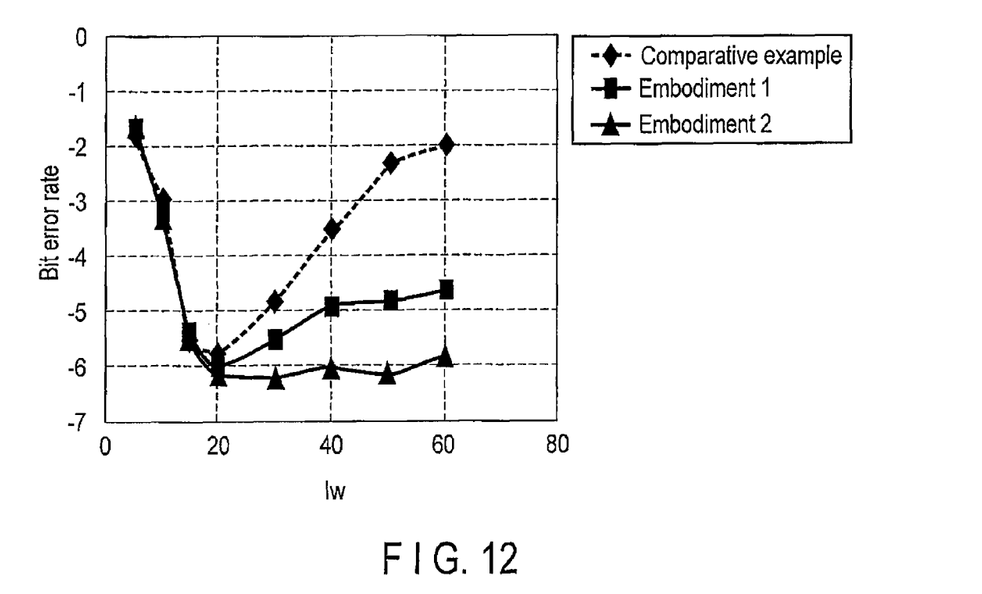
FIG. 12 is a view showing a relationship between a bit error rate and an applied current of each of the recording heads according to the first and second embodiments and that of the recording head according to the comparative example.

As shown in FIG. 12, paying attention to current Iw dependence of the bit error rate (BER) in the comparative example and the embodiments 1 and 2, it can be understood that an amount of deterioration in BER on the high-current side in Embodiment 2 where Ir is 1.5-fold of Iw is more improved than that in a case where Iw and Ir have the same current value (Embodiment 1).

As described above, it is possible to obtain the recording head that can further reduce the return magnetic field immediately below the trailing shield, avoid deterioration or erasing of recorded information, and realize high recording density by using the control module 100 to adjust a total current value flowing through the first and second coils to approximately Ir=Iw×1.5, and also obtain the disk drive including this recording head.

Third Embodiment

Figure 13:
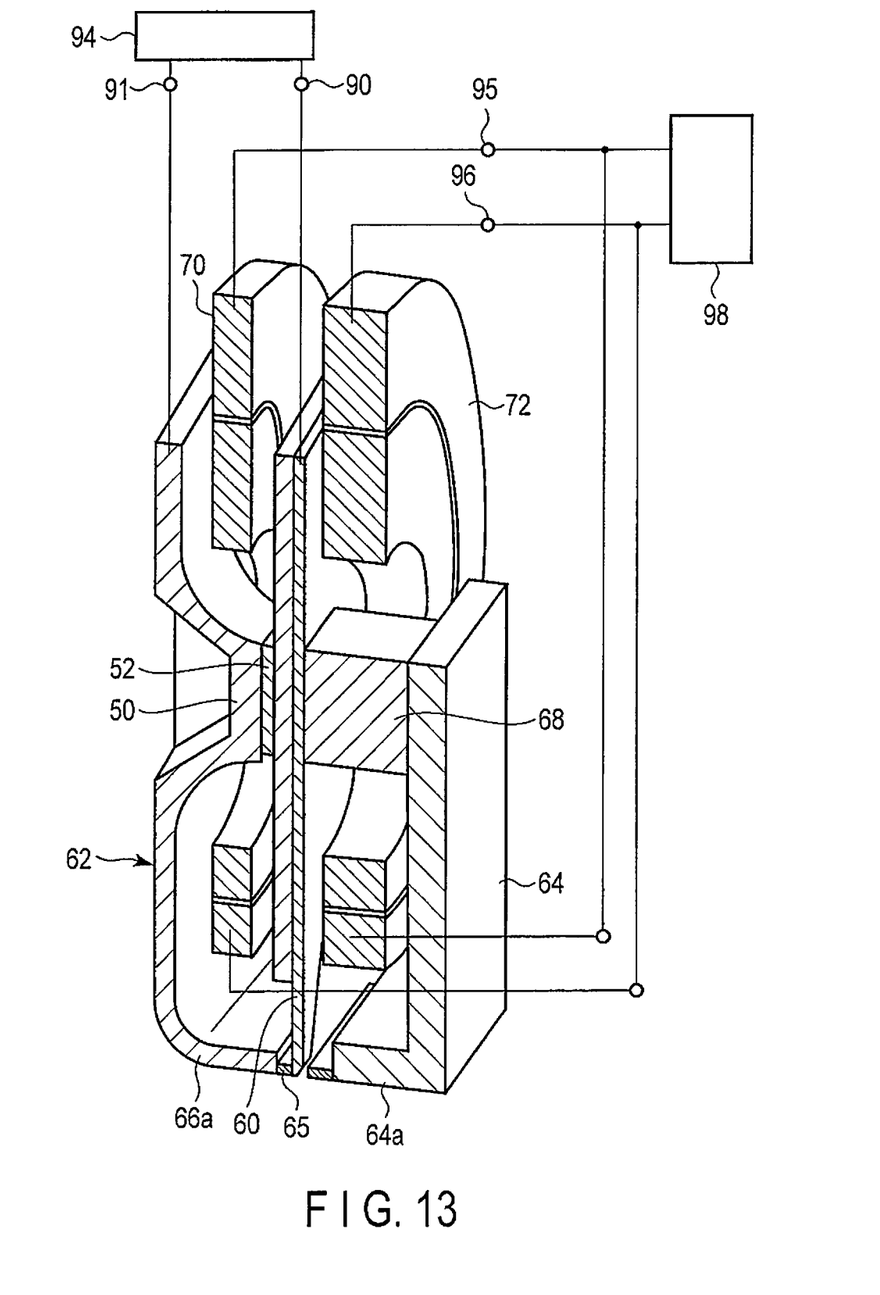
FIG. 13 is a perspective view schematically showing a recording head of an HDD according to a third embodiment.

FIG. 13 shows a recording head of an HDD according to a third embodiment. According to this embodiment, a second coil 72 wound around a leading shield 64 is configured to have a cross-sectional area larger than that of a first coil 70 wound around a trailing shield 62. The first and second coils 70 and 72 have the same number of turns. The first coil 70 and the second coil 72 are connected in parallel to a power supply 98 which supplies a current to these coils, and they configure a parallel circuit.

According to such a configuration, resistance in the second coil 72 connected through the parallel circuit is lower than resistance in the first coil 70, and a total current value Ir flowing through the second coil 72 can be set to be larger than a total current value Iw in the first coil 70, thereby effectively suppressing a return magnetic field immediately below the trailing shield like the second embodiment.

Fourth Embodiment

Figure 14:
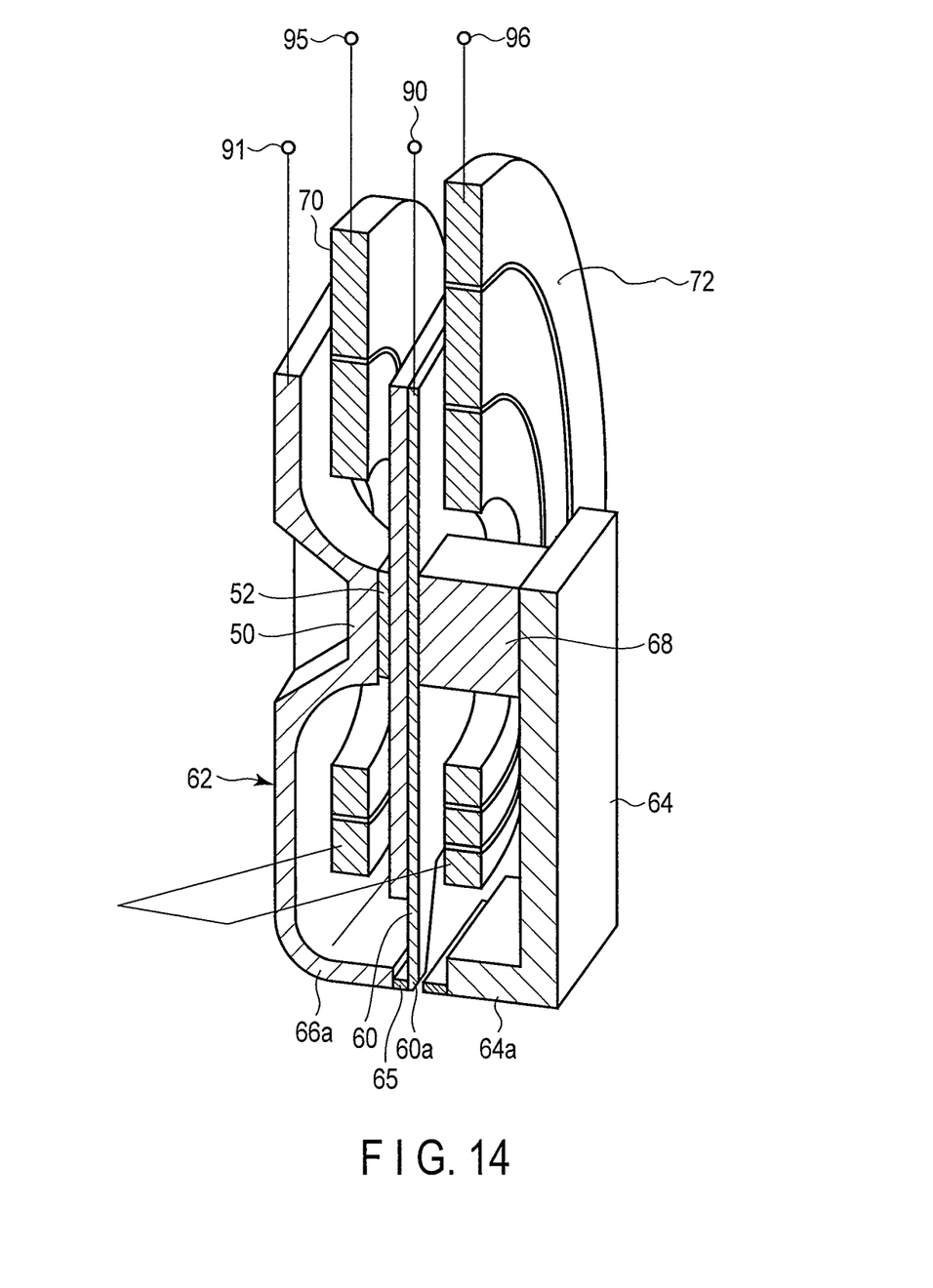
FIG. 14 is a perspective view schematically showing a recording head of an HDD according to a fourth embodiment.

FIG. 14 shows a recording head of an HDD according to a fourth embodiment. According to this embodiment, the number of turns of a second coil 72 wound around a leading shield 64 is larger than the number of turns of a first coil 70 wound around a trailing shield 62, and it is, e.g., 1.5-fold. The first coil 70 and the second coil 72 are connected to a power supply 98 in series through terminals 95 and 96.

According to such a configuration, a total current value Ir flowing through the second coil 72 can be set to be larger than a total current value Iw flowing through the first coil 70, thus effectively suppressing a return magnetic field immediately below the trailing shield like the second embodiment.

As described above, according to the first to fourth embodiments, it is possible to provide the recording head that can avoid deterioration or erasing of recorded information and realize high recording density and also provide the disk drive including this recording head.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, materials, shapes, dimensions, and others of elements constituting the head portion can be changed as required. Further, in the magnetic disk drive, the numbers of the magnetic disks and the magnetic heads can be increased as required, and various sizes of the magnetic disk can be selected.

What is claimed is:

1. A recording head comprising:
    a main pole configured to apply a recording magnetic field in a direction perpendicular to a recording layer of a recording medium;
    a trailing shield on a trailing side of the main pole with a write gap therebetween, comprising a first connecting portion connected to the main pole through a non-conductor and a second connecting portion connected to an end portion of the main pole on the recording medium side through a non-magnetic conductive layer, and configured to form together with the main pole a first magnetic core;
    a first coil wound around the first magnetic core;
    a leading shield on a leading side of the main pole, the leading shield having a substantially L-like shape comprising an upright portion extending in parallel to the main pole and a lower end portion extending along a medium facing surface from an end of the upright portion on the recording medium side to a position close to the end portion of the main pole on the recording medium side such that a closed magnetic path that includes the main pole and the leading shield is formed, the lower end portion of the leading shield comprising a lower end surface exposed on the medium facing surface and a trailing side end surface facing the end portion of the main pole on the recording medium side through a non-magnetic material disposed in a gap therebetween, and the leading shield being configured to form, together with the main pole, a second magnetic core;

a third connecting portion connected to the upright portion and the main pole, the third connecting portion comprising a magnetic material;

a second coil wound around the second magnetic core; and a connection terminal configured to flow a current through the main pole, the non-magnetic conductive layer, and the trailing shield.

2. The recording head of claim 1, further comprising a high-frequency oscillator between the main pole and the non-magnetic conductive layer.

3. The recording head of claim 1, wherein the first coil and the second coil are wound in opposite directions.

4. The recording head of claim 1, wherein the first coil and the second coil are connected in parallel, and the second coil comprises resistance smaller than that of the first coil.

5. The recording head of claim 4, wherein the second coil comprises a cross-sectional area larger than that of the first coil.

6. The recording head of claim 1, wherein the second coil comprises a number of turns larger than that of the first coil.

7. The recording head of claim 2, wherein the first coil and the second coil are wound in opposite directions.

8. The recording head of claim 7, wherein the first coil and the second coil are connected in parallel, and the second coil comprises resistance smaller than that of the first coil.

9. The recording head of claim 8, wherein the second coil comprises a cross-sectional area larger than that of the first coil.

10. The recording head of claim 2, wherein the second coil comprises a number of turns larger than that of the first coil.

11. The recording head of claim 3, wherein the second coil comprises a number of turns larger than that of the first coil.

12. The recording head of claim 2, wherein the first coil and the second coil are connected in parallel, and the second coil comprises resistance smaller than that of the first coil.

13. The recording head of claim 3, wherein the first coil and the second coil are connected in parallel, and the second coil comprises resistance smaller than that of the first coil.

14. The recording head of claim 1, wherein the second coil comprises a cross-sectional area larger than that of the first coil.

15. The recording head of claim 2, wherein the second coil comprises a cross-sectional area larger than that of the first coil.

16. The recording head of claim 3, wherein the second coil comprises a cross-sectional area larger than that of the first coil.

17. A disk drive comprising:

a recording medium comprising a magnetic recording layer having magnetic anisotropy in a direction perpendicular to a medium surface;

a drive module configured to rotate the recording medium; and a magnetic head comprising a recording head of claim 1, configured to perform information processing with respect to the recording medium.

18. The disk drive of claim 17, comprising: a first power supply configured to flow a current through the main pole, the non-magnetic conductive layer, and the trailing shield of the recording head; a second power supply configured to supply a current to the first coil and the second coil; and a control module configured to control a current amount in such a manner a total current value which is a predetermined multiple with respect to a total current value of the first coil is applied to the second coil.

19. A disk drive comprising:

a recording medium comprising a magnetic recording layer having magnetic anisotropy in a direction perpendicular to a medium surface;

a drive module configured to rotate the recording medium;

and a magnetic head comprising a recording head of claim 2, configured to perform information processing with respect to the recording medium.

20. The disk drive of claim 19, comprising: a first power supply configured to flow a current through the main pole, the non-magnetic conductive layer, and the trailing shield of the recording head; a second power supply configured to supply a current to the first coil and the second coil; and a control module configured to control a current amount in such a manner a total current value which is a predetermined multiple with respect to a total current value of the first coil is applied to the second coil.

* * * * *